2,795,633

DEMETHYLATION PROCESS

Harry L. Coonradt, Woodbury, Wilbur K. Leaman, Pitman, and Barton W. Rope, Mullica Hill, N. J., assignors to Socony Mobil Oil Company, Inc., a corporation of New York No Drawing. Application September 16, 1952, Serial No. 309,930

9 Claims. (Cl. 260—672)

This invention relates to the demethylation of hydrocarbons. It is more particularly concerned with the catalytic removal of one or more methyl groups from methyl-substituted aromatic hydrocarbons.

As is well known to those familiar with the art, many processes have been proposed for removing alkyl groups of two or more carbon atoms from alkyl aromatic compounds. Such a reaction proceeds readily to good yields. In direct contrast thereto, however, demethylation has been relatively difficult to achieve in good yield. It has been proposed to effect the demethylation of methylbenzenes in the presence of an activated alumina catalyst. Relatively few other catalysts, however, have been proposed for demethylation processes in the past.

It has now been found that methyl-substituted aromatic hydrocarbons can be demethylated in the presence of a catalyst which is novel for the process. It has been discovered that catalytic demethylation can be achieved in the presence of hydrogen and an alumina-silica catalyst, in better yields than are obtainable with activated alumina. In addition, the demethylation of methyl-substituted naphthalenes can be effected with a minimum of coking when the alumina-silica catalyst is used.

Accordingly, it is an object of the present invention to provide a catalytic process for the demethylation of methyl-substituted aromatic hydrocarbons. Another object is to provide a catalytic process for the production of benzene from toluene and the like. A further object is to provide a catalytic process for the production of naphthalene from methyl-substituted naphthalenes. A specific object is to provide a process for the demethylation of methyl-substituted aromatic hydrocarbons in the presence of hydrogen gas and of an alumina-silica catalyst. Other objects and advantages of this invention will become apparent to those skilled in the art, from the following detailed description.

In general, the present invention provides a process for the demethylation of methyl-substituted aromatic hydrocarbons, which comprises contacting the hydrocarbons with an alumina-silica catalyst, at a temperature of between about 1000° F. and about 1200° F., for a period of time of between about two seconds and about 1000 seconds, and in the presence of hydrogen gas.

It has been found that the process of this invention, utilizing an alumina-silica catalyst, is applicable to the demethylation of polynuclear as well as mononuclear methyl-substituted aromatic hydrocarbons. The aromatic hydrocarbon reactant can contain one methyl group or it can contain more than one methyl group. In the case of the polymethyl-substituted aromatic hydrocarbons, one or more methyl groups can be removed. Thus, xylene can be demethylated to produce toluene predominately, or benzene predominately.

The mononuclear methyl-substituted aromatic hydrocarbons contemplated herein are the methylbenzene compounds. The process is also applicable to charge stocks containing methyl-substituted benzenes in admixture with other hydrocarbons, such as, for example, highly-aromatic petroleum fractions. Non-limiting examples of the methylbenzenes contemplated herein are toluene, o-xylene, m-xylene, p-xylene, hemimellitene, pseudocumene, mesitylene, prehnitene, durene, and pentamethylbenzene; and mixtures of hydrocarbons containing one or more of these compounds.

The polynuclear compound reactants include the methyl-substituted naphthalenes and the like. Non-limiting examples are 1-methylnaphthalene; 2-methylnaphthalene; 1,4-dimethylnaphthalene; 2,3-dimethylnaphthalene; 2,7-dimethylnaphthalene; 1-methylanthracene; 2,4-dimethylanthracene; 1,2,5-trimethylnaphthalene; 1-methyl-4-ethylnaphthalene; 1-methyl-7-isopropylnaphthalene; 1,4-dimethyl-6-ethylnaphthalene; 9,10-dimethylphenanthrene; 3-methylphenanthrene; and mixtures containing two or more of the foregoing. The charge material can be relatively pure methyl aromatic hydrocarbon or it can be a mixture of two or more. Likewise, the charge can be a hydrocarbon fraction which is rich in methyl-substituted polynuclear aromatic hydrocarbons, such as certain aromatic petroleum fractions.

The catalysts utilizable in the process of this invention are composited alumina-silica catalysts. Such catalysts can be prepared by any of the methods known to the art for preparing catalysts containing alumina and silica, such as by impregnation of alumina, by coprecipitation, etc. The silica content of the catalyst can vary between about one percent and about 20 percent, by weight. Preferably, it varies between about four percent and about 10 percent, by weight. The balance of the catalyst is alumina. It is to be understood that the present process is not to be limited by the particular method of preparing the alumina-silica catalyst. It has been found that alumina-silica catalysts prepared by various methods are applicable herein, provided the silica content falls within the range set forth hereinbefore. Also, the catalyst can be in any of the usual forms used for catalytic materials, i. e., rods, pellets, spheroids, etc.

In the process of this invention, time, temperature, and pressure are critical interrelated factors. In general, the contact time varies inversely proportional to the temperature, and the pressure varies directly with the temperature.

The temperatures utilizable herein, usually the temperature of the catalyst, can vary between about 1000° F. and about 1200° F. In practice, it is preferred to operate at temperatures of between about 1050° F. and about 1150° F. In practice, the contact time will depend upon the pressure conditions used, as well as varying inversely with temperature. At atmospheric pressures, the contact time will be between about two seconds and about 50 seconds, preferably between about five second and about 20 seconds. Under superatmospheric pressures, larger contact times are desirable. Hence, under such conditions, the contact time will be between about 30 seconds and about 1000 seconds, and preferably between about 50 seconds and about 500 seconds. Accordingly, the general range of contact time is between about two seconds and about 1000 seconds. It is preferred to use contact times of between about five seconds and about 500 seconds.

The hydrogen pressure can be subatmospheric, atmospheric or superatmospheric. Preferably, and in order to minimize coking, pressures of between about 100 pounds and about 1000 pounds per square inch gauge are used. The hydrogen can be supplied to the reaction vessel as relatively pure hydrogen gas. Hydrogen-rich gaseous mixtures, such as reformer overheads and the like, can be used, however. The molar proportion of hydrogen to methyl-substituted aromatic hydrocarbon can vary between about 0.5:1, respectively, and about 10:1, respectively, and preferably between about 1:1, respectively, and about 5:1, respectively.

Since the temperatures employed in the process of this invention are well above the boiling point of methyl-substituted aromatic hydrocarbons, it will be apparent that the present process usually involves a vapor phase operation, but it is not restricted thereto. Any reaction vessel suitable for carrying out contact catalytic operations can be used. The reactor should be provided with suitable means for maintaining the catalyst temperature. Contact between the catalyst and the charge material can be effected by passing the charge vapors over or through the catalyst. The catalyst can be in the form of a fixed bed or a moving bed. The process, of course, can be performed in a batch process. It is preferable, however, to employ continuous operation. In such an operation, the charge is passed through the reactor in contact with the catalyst. Then the effluent reaction product is subjected to a product separation operation. The portion of the charge stock which remains undemethylated and/or which is incompletely demethylated (as with polymethyl-substituted charge materials) can be recycled to the reactor, until the maximum ultimate conversion has been effected.

The following examples are for the purpose of demonstrating the process of this invention and the superior results obtained therefrom. It must be strictly understood that this invention is not to be limited by the reactants and conditions used in the examples, or by the operations and manipulations involved therein. As will be apparent to those skilled in the art, other reactants and conditions, as set forth hereinbefore, can be used to practice this invention.

APPARATUS AND OPERATION

The reactor used in the runs described in the examples was a stainless steel tube suspended in a bath of molten lead. The temperature of the lead was controlled to maintain the catalyst temperature constant to within about 10° F. Catalyst temperature was measured by means of thermocouples extending into the top, middle, and bottom portions of the catalyst bed. A total volume of about 150 cubic centimeters of catalyst was placed in the reactor. Accessory equipment included a heated, thermostatically controlled burette for measuring the charge, pumps, preheater coils, a condensing and collecting system for aromatic and gaseous products, and a system for determining the amount of coke on the catalyst by a combustion method.

In operation, the catalyst, at operating temperature, was purged with nitrogen gas; followed by a flushing with hydrogen. Then, the charge material, in the liquid state, together with added gases or liquids was passed through a preheater to raise the temperature thereof to the reaction temperature. The combined charge was then passed downwardly through the catalyst bed at a rate sufficient to effect the desired contact time. A sample of the total gas collected was analyzed in the mass spectrometer to determine its composition and the weight of the components. The principal component, other than hydrogen, was methane.

The amount of coke laid down on the catalyst was determined by combustion methods, i. e., by converting it to carbon dioxide and analyzing therefor; or by burning the coke off the spent catalyst and determining the resulting loss in catalyst weight. The relative amounts of aromatic materials present in a sample of the liquid products was determined by usual methods, i. e., by mass spectrometer, ultraviolet light spectrometer, distillation, etc.

DEMETHYLATION OF METHYLBENZENES

Example 1

Toluene was subjected to demethylation by contacting it with an alumina-silica catalyst containing about 5.7 percent silica, by weight, at a temperature of about 1100° F., for a contact time of about 180 seconds, and in the presence of hydrogen gas under a pressure of 400 pounds per square inch gauge; the molar proportion of hydrogen to toluene being about 2.4:1, respectively. Pertinent data and results are set forth in Table I.

Example 2

Toluene was subjected to demethylation under the conditions set forth in Example 1, except that the catalyst used was commercial activated alumina. Pertinent data and results for this run are set forth in Table I.

Example 3

Toluene was demethylated under the conditions of Example 1. The catalyst used, however, was a synthetic catalyst prepared by mixing sodium aluminate with sodium silicate, and reacting with citric acid. After aging in ammonium sulfate and tempering, the resulting catalyst contained about five percent silica, by weight. Pertinent data and results for this run are set forth in Table I.

Example 4

Toluene was demethylated under the conditions described in Example 1. The catalyst used was a commercial alumina-silica catalyst containing about six percent silica, by weight. Pertinent data and results are set forth in Table I.

Example 5

Toluene was demethylated under the conditions described in Example 1. The catalyst used, however, was a commercial alumina catalyst. Pertinent data and results are set forth in Table I.

DEMETHYLATION OF METHYLNAPHTHALENES

Example 6

2-methylnaphthalene was demethylated by contacting it with the catalyst of Example 4, at a temperature of 1100° F., for a contact time of 132 seconds, and in the presence of hydrogen gas, under a pressure of 400 pounds per square inch gauge; the molar proportion of hydrogen to methylnaphthalene being about 5:1, respectively. Pertinent data and results are set forth in Table I.

Example 7

The run of Example 6 was repeated using a commercial alumina catalyst. Pertinent data and results are set forth in Table I.

Examples 8 through 11

1-methylnaphthalene was subjected to demethylation by contacting it with an alumina-silica catalyst containing about five percent silica, by weight. Temperatures of 1000° F. and 1100° F. were used. Various contact times and molar proportions of hydrogen were employed. All of these runs were at atmospheric pressure. Pertinent data and results are set forth in Table I.

TABLE I

| Example | Hydrocarbon | Catalyst | Temp., °F. | Contact Time, Sec. | Pressure, p.s.i.g. | Moles H₂/Mole Hydrocarbon | Weight Percent per Pass | | | | Ultimate Weight Percent | | | | Yield, Percent Theory |
|---|---|---|---|---|---|---|---|---|---|---|---|---|---|---|---|
| | | | | | | | Benzene | Naphthalene | Coke | Gas | Benzene | Naphthalene | Coke | Gas | |
| 1 | Toluene | A[1] | 1,100 | 180 | 400 | 2.4 | 21.2 | | 0.7 | 4.3 | 72.6 | | 2.2 | 14.7 | 85.4 |
| 2 | do | B[2] | 1,100 | 180 | 400 | 2.4 | 16.9 | | 0.1 | 4.2 | 64.4 | | 0.3 | 15.9 | 75.6 |
| 3 | do | C[3] | 1,100 | 157 | 400 | 2.9 | 16.7 | | 0.08 | 3.4 | 81.3 | | 0.4 | 16.3 | 95.5 |
| 4 | do | D[4] | 1,100 | 161 | 400 | 2.8 | 23.4 | | 0.82 | 4.1 | 75.0 | | 2.7 | 13.2 | 88.0 |
| 5 | do | E[5] | 1,100 | 165 | 400 | 2.7 | 20.2 | | 0.80 | 5.5 | 67.6 | | 2.7 | 18.5 | 79.5 |
| 6 | 2-Methyl-naphthalene | D[4] | 1,100 | 132 | 400 | 5.3 | | 53.7 | 1.2 | 16.2 | | 69.5 | 1.6 | 21.0 | 78.0 |
| 7 | do | E[5] | 1,100 | 130 | 400 | 5.4 | | 47.1 | 6.6 | 13.6 | | 62.2 | 8.9 | 18.4 | 70.0 |
| 8 | 1-Methyl-naphthalene | A[1] | 1,100 | 14.0 | None | 1.3 | | 32.1 | 39.1 | 3.7 | | 42.8 | 52.2 | 5.0 | 48.2 |
| 9 | do | A[1] | 1,100 | 11.6 | None | 1.2 | | 30.1 | 22.0 | 2.7 | | 54.9 | 40.1 | 5.0 | 61.7 |
| 10 | do | A[1] | 1,100 | 11.1 | None | 1.2 | | 26.6 | 32.3 | 3.1 | | 42.8 | 52.2 | 5.0 | 48.2 |
| 11 | do | A[1] | 1,000 | 12.9 | None | 1.3 | | 14.8 | 9.0 | 1.3 | | 59.1 | 35.9 | 5.0 | 66.4 |

[1] Alumina-silica catalyst containing 5.7% SiO₂ (Aluminum Ore Co. catalyst designated H-40).
[2] Alumina catalyst (Aluminum Ore Co. catalyst designated F-10).
[3] Synthetic alumina-silica catalyst containing 5% SiO₂.
[4] Commercial alumina-silica catalyst containing 6% SiO₂ (Harshaw Chemical Co. catalyst designated Al-0401).
[5] Commercial alumina (Harshaw Chemical Co. catalyst designated Al-0501).

From the foregoing examples, it will be apparent that methyl-substituted aromatic hydrocarbons can be demethylated in good yield, in the presence of an alumina-silica catalyst and of hydrogen gas. The superiority of the alumina-silica catalyst over the alumina catalyst, in this process, will be apparent from a comparison of the data set forth in Table I. From Examples 8–11, it will be noted that demethylation can be effected under atmospheric pressure conditions. Coking, however, is pronounced, especially at more elevated temperatures. In practice, however, the disadvantages of coking may be counterbalanced by the advantages of not having to use pressure equipment with its attendant difficulties. Of course, if low coking is desired, hydrogen pressure should be employed.

Although the present invention has been described with preferred embodiments, it is to be understood that modifications and variations can be resorted to without departing from the spirit and scope of this invention, as those skilled in the art will readily understand. Such variations and modifications are considered to be within the scope and purview of the appended claims.

What is claimed is:

1. A process for the demethylation of methyl-substituted aromatic hydrocarbons, which comprises contacting a methyl-substituted aromatic hydrocarbon with an alumina-silica catalyst consisting of between about one percent and about 20 percent silica, by weight, and the balance of said catalyst being alumina, at a temperature of between about 1000° F. and about 1200° F., for a period of time of between about two seconds and about 1000 seconds, and in the presence of hydrogen gas.

2. A process for the demethylation of methyl-substituted benzenes, which comprises contacting a methyl-substituted benzene with an alumina-silica catalyst consisting of between about one percent and about 20 percent silica, by weight, and the balance of said catalyst being alumina, at a temperature of between about 1000° F. and about 1200° F., for a period of time of between about 30 seconds and about 1000 seconds, and in the presence of hydrogen gas under a pressure of between about 100 pounds per square inch gauge and about 1000 pounds per square inch gauge.

3. A process for the demethylation of toluene, which comprises contacting toluene with an alumina-silica catalyst consisting of between about four percent and about ten percent silica, by weight, and the balance of said catalyst being alumina, at a temperature of between about 1050° F. and about 1150° F., for a period of time of between about 50 seconds and about 500 seconds, and in the presence of hydrogen gas under a pressure of between about 100 pounds per square inch gauge and about 1000 pounds per square inch gauge.

4. A process for the demethylation of toluene, which comprises contacting toluene with an alumina-silica catalyst consisting of about five percent silica, by weight, and the balance of said catalyst being alumina, at a temperature of about 1100° F. for a period of time of about 157 seconds, and in the presence of hydrogen gas under a pressure of about 400 pounds per square inch gauge.

5. A process for the demethylation of methyl-substituted naphthalenes, which comprises contacting a methyl-substituted naphthalene with an alumina-silica catalyst consisting of between about one percent and about 20 percent silica, by weight, and the balance of said catalyst being alumina, at a temperature of between about 1000° F. and about 1200° F., for a period of time of between about 30 seconds and about 1000 seconds, and in the presence of hydrogen gas under a pressure of between about 100 pounds per square inch gauge and about 1000 pounds per square inch gauge.

6. A process for the demethylation of 2-methylnaphthalene, which comprises contacting 2-methylnaphthalene with an alumina-silica catalyst consisting of between about four percent and about ten percent silica, by weight, and the balance of said catalyst being alumina, at a temperature of between about 1050° F. and about 1150° F., for a period of time of between about 50 seconds and about 500 seconds, and in the presence of hydrogen gas under a pressure of between about 100 pounds per square inch gauge and about 1000 pounds per square inch gauge.

7. A process for the demethylation of 2-methylnaphthalene, which comprises contacting 2-methylnaphthalene with an alumina-silica catalyst consisting of about six percent silica, by weight, and the balance of said catalyst being alumina, at a temperature of about 1100° F., for a period of time of about 132 seconds, and in the presence of hydrogen gas under a pressure of about 400 pounds per square inch gauge.

8. A process for the demethylation of 1-methylnaphthalene, which comprises contacting 1-methylnaphthalene with an alumina-silica catalyst consisting of between about four percent and about ten percent silica, by weight, and the balance of said catalyst being alumina, at a temperature of between about 1050° F. and about 1150° F., for a period of time of between about two seconds and about 50 seconds, and in the presence of hydrogen gas.

9. A process for the demethylation of 1-methylnaphthalene, which comprises contacting 1-methylnaphthalene with an alumina-silica catalyst consisting of about six percent silica, by weight, and the balance of said catalyst being alumina, at a temperature of about 1100° F., for a period of time of about 12 seconds, and in the presence of hydrogen gas.

(References on following page)

References Cited in the file of this patent

UNITED STATES PATENTS

| | | |
|---|---|---|
| 2,194,449 | Sachanen et al. | Mar. 19, 1940 |
| 2,216,262 | Bloch et al. | Oct. 1, 1940 |
| 2,254,555 | Thomas | Sept. 2, 1941 |
| 2,380,279 | Welty | July 10, 1945 |

FOREIGN PATENTS

| | | |
|---|---|---|
| 637,595 | Great Britain | May 24, 1950 |

OTHER REFERENCES

Sachanen: Conversion of Petroleum, 2nd edition, page 88 (1 page only). Published by Reinhold Pub. Corp., New York (1948).

Thomas et al.: Jour. Am. Chem. Soc., vol. 66, pages 1694–96, October 1944.